United States Patent [19]

Miller et al.

[11] 4,131,642

[45] Dec. 26, 1978

[54] TREATMENT OF THE WASTE FROM THE PRODUCTION OF TERTIARY BUTYL AMINE TO RECOVER SODIUM SULFATE AND METHYL OR SODIUM FORMATE

[75] Inventors: Ralph Miller, Pleasantville, N.Y.; Harry D. Gregg, Jr., Greensboro, N.C.

[73] Assignee: Ciba-Geigy Corporation, Ardsley, N.Y.

[21] Appl. No.: 824,306

[22] Filed: Aug. 12, 1977

Related U.S. Application Data

[63] Continuation-in-part of Ser. No. 724,746, Sep. 10, 1976, abandoned.

[51] Int. Cl.$^2$ .................. C01D 5/00; C07C 53/02; C07B 21/00
[52] U.S. Cl. .................................. 423/193; 423/551; 260/583 P; 260/701; 562/513; 562/609; 560/248; 560/265
[58] Field of Search .................. 423/193, 199, 551; 260/488 F, 499, 542, 561 R, 583 N, 583 R, 583 P, 527 R, 616, 635 P, 637 R, 637 P, 643 R, 643 A, 701, 703, 705

[56] References Cited

U.S. PATENT DOCUMENTS

| 1,426,457 | 8/1922 | Burghart | 260/488 F |
| 2,407,920 | 9/1946 | Cox | 260/488 F |
| 2,433,323 | 12/1947 | Reiter et al. | 260/499 |
| 2,819,307 | 1/1958 | Albert | 260/561 R |
| 3,578,703 | 5/1971 | Schoenbrunn et al. | 260/488 F |
| 3,718,732 | 2/1973 | Winslow, Jr. et al. | 423/199 |

FOREIGN PATENT DOCUMENTS

| 2465 of | 1913 | United Kingdom | 260/499 |
| 349678 | 11/1972 | U.S.S.R. | 260/488 F |
| 345128 | 11/1972 | U.S.S.R. | 260/542 |

*Primary Examiner*—O. R. Vertiz
*Assistant Examiner*—Gary P. Straub
*Attorney, Agent, or Firm*—Wenderoth, Lind & Ponack

[57] ABSTRACT

Isobutylene, hydrogen cyanide and sulfuric acid are reacted to produce tertiary butyl formamide, which is hydrolyzed by sodium hydroxide to produce tertiary butyl amine. The tertiary butyl amine is removed by vaporization and the residue is treated with sulphuric acid and methanol and is distilled to recover formate values as methyl formate or sodium formate. There is additionally recovered crystalline sodium sulfate and a water immiscible yellow organic phase.

9 Claims, No Drawings

TREATMENT OF THE WASTE FROM THE PRODUCTION OF TERTIARY BUTYL AMINE TO RECOVER SODIUM SULFATE AND METHYL OR SODIUM FORMATE

This is a continuation-in-part of Ser. No. 724,746, filed Sept. 10, 1975, now abandoned.

BACKGROUND OF THE INVENTION

This invention is concerned with the production of tertiary butylamine (TBA), methyl or sodium formate and sodium sulfate in a single overall production scheme.

Tertiary butylamine has been made for more than 20 years by initially forming N-tertiary butyl formamide from HCN and isobutylene in the presence of sulfuric acid as first disclosed by Ritter, U.S. Pat. No. 2,573,673, followed by the alkaline hydrolysis of the formamide to form the TBA. After recovery of TBA, there remains a complex residual mixture which contains sodium formate, sodium hydroxide sodium sulfate (solid and aqueous) and complex organic impurities of unknown structure.

This residual mixture has always been a waste material. Its disposal has become increasingly expensive as ever more stringent regulations for the protection of the environment have been promulgated by governmental authorities following the legislation passed by State legislatures and Congress. One commercial manufacturer is no longer in a position to make TBA because EPA regulations are violated by any disposal method which is economically tolerable. Recent price increases have been primarily the result of increased effluent disposal cost rather than increased raw material or increased processing cost.

The present invention not only avoids the expenditures resulting from such effluent disposal but actually permits coproduction of sodium or methyl formate and sodium sulfate along with the TBA.

THE PRIOR ART

The N-tertiary-butyl formamide is made substantially in accordance with the teachings of Albert, U.S. Pat. No. 2,819,307, Jan. 7, 1958 the disclosure of which is incorporated herein by reference. According to this reference process the following equations are believed to represent the reactions which occur:

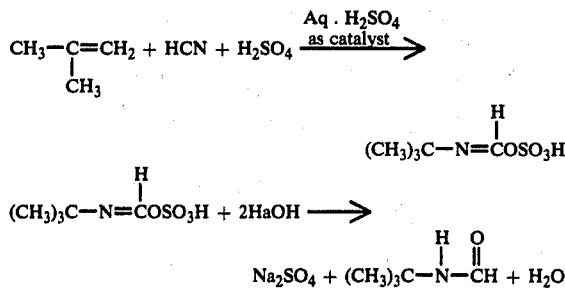

The alkaline hydrolysis to tert-butylamine (TBA) of the formamide is taught by J. Ritter et al., J.A.C.S., Volume 70, page 4078 (1948). Sodium formate is formed as a co-product. The reaction is shown by the following equation:

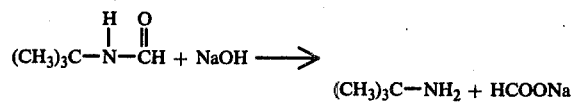

The above Albert patent discloses how the formamide can be isolated. The procedure is to complete the reaction between the isobutylene and hydrogen cyanide in the presence of sulfuric acid and then to neutralize all of the sulfuric acid charged to the process. An organic liquid phase separates from the aqueous phase. The N-tertiary butylformamide is contained in the organic liquid phase.

When the mixture formed after completing the reaction between isobutylene and hydrogen cyanide in the presence of sulfuric acid is neutralized with concentrated sodium hydroxide, (more than one mole for each equivalent of hydrogen cyanide and sulfuric acid employed), a heterogeneous mixture forms, consisting of 1) an organic liquid phase in which N-tertiary butylformamide and organic impurities of unknown structure are contained and 2) an aqueous phase containing dissolved sodium sulfate and solid sodium sulfate.

The organic liquid phase can be separated from the aqueous phase.

The formamide content of the organic phase recovered as such can be hydrolyzed with additional caustic soda to form TBA and sodium formate in accordance with the above equation. If the N-tertiary butylformamide is to be converted to TBA and sodium formate, it is commercial practice to form the formamide and then neutralize all of the sulfuric acid present and to make a strongly alkaline mixture. The mixture is then heated and hydrolysis of the formamide to TBA and sodium formate is as shown above and the residual product, containing sodium sulfate, sodium formate and unknown organic impurities is discarded.

Duclaux, British Pat. No. 2465, July 17, 1913, disclosed that methyl and ethyl formate are prepared "by the direct action of formic acid even when largely diluted with water upon methyl and ethyl alcohol". Duclaux employed his finding to improve the manufacture of artificial silk and other nitrocellulose products.

Helbronner et al. U.S. Pat. No. 1,260,977, Mar. 26, 1918, shows that acetic acid and formic acid could be recovered from pyroligneous acid and similar aqueous solutions containing small concentrations of acetic and formic acid by forming, vaporizing and recovering the methyl esters. He, too, stated that a stoichiometric excess of alcohol should be used calculated on the amount of aliphatic acid contained in the dilute aqueous mixture. The procedure is readily workable because the vapor pressure of the methyl esters of the lower aliphatic acids is very much greater than the vapor pressure of the acids themselves. This enables the esters to be easily vaporized from their aqueous solutions.

Burghart, U.S. Pat. No. 1,426,457, Aug. 22, 1922, discloses the production of low boiling simple esters of formic, acetic and butyric acids from distillery wastes by a complicated procedure, the last part of which consists of the addition of methyl alcohol to an acidulated mixture containing the acids to form the methyl esters followed by their vaporization and recovery.

Cox, U.S. Pat. No. 2,407,920, Sept. 17, 1946, discloses a method of obtaining increased yields of pentaerythritol from the crude reaction mixture in which it was formed by separating the formate also contained in the mixture. The removal of the formate makes it possible to recover increased amounts of crystalline pentaerythritol. The separation of the formate is achieved by converting it to its methyl ester and vaporizing it from the mixture in which it was formed.

Reiter et al., U.S. Pat. No. 2,433,323, discloses a method of processing a mixture composed principally of formic acid, acetic acid and water, which mixture is a pyroligneous acid concentrate. The process involves forming a formate ester and distilling it out of the mixture in which it was formed. The acetic acid can then be more readily recovered from the formic-acid free residual mixture.

Schoenbrunn et al., U.S. Pat. No. 3,578,703, May 11, 1971, shows the formation, vaporization and recovery of methyl formate by acidulating an aqueous solution of an alkali or alkaline earth formate, adding methanol to the mixture and then forming, vaporizing and recovering methyl formate. The procedure is almost exactly that described by Duclaux.

Winslow et al., U.S. Pat. No. 3,718,732, Feb. 27, 1973, discloses a method of acidulating with sulfuric acid a mixture containing methyl alcohol, methyl formate, sodium formate, sodium bisulfite, sodium sulfite and sodium thiosulfate to initially liberate sulfur dioxide and formic acid from their respective sodium salts and to form sodium sulfate, expelling the sulfur dioxide, distilling off the methyl alcohol and methyl formate and completing the decomposition of the thiosulfate, the decomposition resulting in the formation of additional sulfur dioxide, elemental sulfur and sodium sulfate. The only water insoluble material formed is elemental sulfur. It is filtered off. The filtrate is an aqueous solution of sodium sulfate. It can be recovered by evaporating the water.

As stated in the patent, the sodium formate and the methyl formate are raw materials used to produce sodium hydrosulfite so that this process fundamentally is the recovery of unreacted raw material. The process is carried out to remove the thiosulfate formed by an undesirable side reaction.

None of the prior art discloses or even hints at the production of TBA, sodium sulfate and sodium or methyl formate as a joint overall operation. Prior to this invention along with the production of one pound of TBA there has been the need to dispose of about 7 pounds of objectionable waste. As explained above, the disposal of this waste has become increasingly expensive. By this new process, the waste disposal costs of the prior art are eliminated and simultaneously appreciable quantities of salable sodium sulfate and salable methyl formate or sodium formate are obtained without any increase in the consumption of relatively expensive isobutylene and hydrogen cyanide. Moreover, the increased revenue obtainable by the use of this invention makes its practice attractive even if there is no waste disposal cost.

The present applicants were faced with a bar more severe than that facing Winslow et al.

Neither Winslow et al. nor the other prior art discussed above, had to deal with purifying a crude, complex residual material of the type dealt with in the present invention, i.e. the residue formed after tertiary butylamine recovery.

The seemingly refractory nature of this complex mixture left no commercial alternative to throwing it away because no process was known or available by which the components of the mixture could be recovered in sufficient purity to meet commercial requirements at a processing cost below the total value of the recovered substances.

Thus, in the prior art processes, the sole commercial product was the t-butylamine and a not insignificant part of its production cost involved disposal of residual materials, i.e. materials remaining after the t-butylamine has been separated and removed.

SUMMARY OF THE INVENTION

In accordance with the present invention, by an economical method, high yields of unexpectedly high-quality sodium sulfate and methyl formate are obtained from the mixture remaining after the distillation of TBA. Sufficient additional sulfuric acid is added to the mixture to bring the pH down to about 3.5 or less to convert the sodium formate to formic acid. Methanol in excess of the stoichiometric amount is added and the formic acid is esterified to form methyl formate.

Methyl formate and excess methanol are recovered by distillation from the acidic slurry.

The slurry is then neutralized with sodium hydroxide to form a three-phase system consisting of solid sodium sulfate, an aqueous solution saturated with sodium sulfate and a water-immiscible, organic phase less dense than the aqueous solution.

The fortuituous discovery was made that as a result of the above steps, all of the impurities formed in the process are concentrated in the water-immiscible, organic phase, which was found to liquefy at a temperature close to 50° C. Consequently, crystalline and aqueous sodium sulfate of excellent quality, i.e. white crystals and a clear colorless sodium sulfate solution, are easily separated from the yellow organic phase, which conveniently forms a top layer, thus making it surprisingly economical to obtain good-quality sodium sulfate.

It should be appreciated that there are two reasons for the economical recovery of high-quality sodium sulfate from its solution. One reason is that the solution is substantially free from all other materials because of the prior conversion of the sodium formate to formic acid and its substantially complete removal from the solution by vaporization in the form of methyl formate. The other reason is that the solution is saturated with sodium sulfate so that only a little more than two parts of water have to be evaporated for each part of anhydrous sodium sulfate obtained from the solution. Thus the removal and recovery of the formate as methyl formate has the concomitant effect of allowing sodium sulfate to be economically recovered solely at the expense of evaporating some water. In fact, if a saturated sodium sulfate solution is needed or can be sold, even this cost can be avoided. As stated above, these benefits are obtained because of the discovery that all of the organic substances formed in the different steps of the process, other than tertiary butyl amine and methyl formate, become a part of the water immiscible, organic liquid phase which is amenable to simple mechanical separation from the water-white aqueous sodium sulfate solution.

The economic benefit of being able to inexpensively recover the sodium sulfate by the use of this invention can be appreciated by a consideration of its chemistry. Substantially 3 moles of sodium sulfate are recovered for each mole of tertiary butyl amine produced. Stated another way, at least 6 pounds of sodium sulfate are recovered as salable product for each pound of tertiary butyl amine produced. This is in addition to the recovery of about two-thirds of a pound of methyl formate for each pound of tertiary butyl amine that is made.

The process described above is economically desirable when a worthwhile market exists for methyl formate. When a formate is required, supplying it as methyl formate is not economical compared with supplying it as sodium formate. Accordingly, there is described below an effective method for operating the process to produce sodium formate.

DETAILED DESCRIPTION OF THE INVENTION

The reaction conditions for the formation of t-butyl amine, can, to some extent, control the amount of impurities produced. Elevated temperatures during the reaction with isobutylene lead to decreased t-butyl amine yields. However, even under the most favorable conditions, a significant quantity of the yellow residue always contaminates the solid and aqueous sodium sulfate present in the residual mixture.

In the performance of the present invention, it is desirable to carry out both the reaction to produce TBA and the other reactions employing as little water as possible. The use of sulfuric acid having a concentration of at least about 87% and caustic soda having a concentration of at least about 50% is recommended so that the total amount of water in the reaction mixture is minimized. This keeps evaporation costs sufficiently low and makes recovery of sodium sulfate more attractive.

The esterification of the formic acid may be performed at a pH of about 3.5 or less with the preferred range being from about 1 to 2. At a pH above about 3.5, the reaction proceeds at an unacceptably slow rate. At a pH below about 0.4, no benefits are realized and the additional acid required to achieve such low pH is unnecessary.

The quantity of methanol employed for esterification should be in molar excess of the formic acid present. The preferred excess of methanol is about 2 to 10 molar equivalents per mole of formic acid to be esterified.

The esterification reaction is most conveniently performed by refluxing without permitting any of the methyl formate to escape during reflux. Esterification is usually complete in about 30 minutes to one hour.

The resulting slurry is then heated to about 100° C. to distill off the methyl formate and unreacted methanol as well as some water. This distillate is subsequently fractionated to recover good-quality methyl formate and methanol containing only small amounts of water, e.g. 0.5 to 5%. The water is substantially free from methanol and can be discarded. The methanol is suitable for recycling to a subsequent batch.

The methanol-free slurry, if permitted to stand and cool, will solidify.

This slurry is neutralized by addition of sodium hydroxide to a pH of between 6 and 8.

Upon neutralization, and standing at a somewhat elevated temperature, the reaction mixture conveniently separates into three distinct layers:

1. A dense slurry of white crystals of sodium sulfate as the lower layer,
2. A clear, colorless solution of sodium sulfate as the intermediate layer,
3. A yellow, organic liquid, with a specific gravity below 1, immiscible in water, which on being cooled to below about 50° C., forms a light, yellow waxy solid, as the upper layer.

These phases are readily separated by conventional means, preferably keeping the temperature high enough to retain the unidentified, water-immiscible, yellow organic material in the liquid state.

The sodium sulfate can be recovered in hydrated form by crystallization below about 32° C. or as the anhydrous salt at temperatures above 32° C.

The following examples are illustrative.

*Example 1* — Into a 500 ml 4-neck flask equipped with an agitator, addition funnel, gas inlet tube, condenser and receiver with means for returning reflux, was placed one mole of 87% sulfuric acid, prepared by mixing 102 grams of 98% sulfuric acid with 12.6 grams of water. Fifteen grams (0.555 mole) of liquid hydrogen cyanide were placed in the addition funnel. The flask was cooled in an ice-bath and 4 ml of the hydrogen cyanide was added from the addition funnel. During a period of 60 minutes a total of 30 grams (0.535 moles) of isobutylene were passed into the solution at a constant rate through the gas inlet tube while the temperature was maintained at 20° C. to 25° C. The remaining hydrogen cyanide was added over a 40-minute period.

The reaction mixture was then heated to 55° C. to 60° C. for 1 hour. After cooling for an hour, it was neutralized and made alkaline with a total of 220 grams of 50% sodium hydroxide. The alkaline suspension was refluxed for one-half hour. Then t-butyl amine (30.2 grams, 77% based on isobutylene), resulting from the t-butyl formamide hydrolysis, was distilled and recovered at 43° C. to 49° C.

Methyl formate was prepared by acidifying the alkaline pot residue with 98% sulfuric acid to pH 0.4 and adding two molar equivalents of methanol (35.7 grams, 1.116 mole). The mixture was refluxed one-half hour. The methyl formate (21.4 grams, 61% based on isobutylene) was distilled at 31 to 35° C. into a receiver cooled in an ice bath.

*Example 2* — Into a one liter, 5-neck flask equipped as the flask in Example 1, were placed three moles of 87% sulfuric acid, prepared by mixing 300 grams of 98% sulfuric acid with 37.8 grams of water. Forty-nine grams (1.813 mole) of liquid hydrogen cyanide were placed in the addition funnel. The flask was cooled in an ice-bath and 6 ml of the hydrogen cyanide was added from the addition funnel. Isobutylene was passed into the solution through the gas inlet tube while the temperature was maintained at 20° C. to 25° C. The remaining hydrogen cyanide was added dropwise over a 62-minute period and a total of 91 grams (1.622 mole) of isobutylene was absorbed in 161 minutes.

The reaction mixture was then heated to 55° C. to 60° C. with nitrogen sparging for one-half hour. After cooling, it was neutralized and made alkaline with a total of 660 grams of 50% sodium hydroxide. The alkaline suspension was refluxed for one-half hour. Then t-butyl amine (85.6 grams, 72% based on isobutylene) was distilled and recovered at 43° C. to 49° C.

Methyl formate was prepared by acidifying the alkaline pot residue with 98% sulfuric acid to pH 2.8 and adding 1.2 molar equivalents of methanol (62.3 grams, 1.95 mole). The mixture was refluxed 1 hour at 65° C. with no apparent esterification (methyl formate, b.p. 32° C.). An additional 41.6 grams (1.29 mole) of methanol was added. However, no methyl formate was formed. A recheck of the pH indicated that it had increased to pH 4.3. An additional 25 ml of 98% sulfuric acid was necessary to lower the pH to pH 3.0 at which point esterification occurred under reflux conditions. The methyl formate (113.8 grams, 59% based on isobutylene) was distilled at 31° C. to 35° C. into a receiver cooled in an ice-bath.

The acidic pot residue was neutralized with 50% sodium hydroxide and the slurry was filtered on a Buchner funnel at 40° C. to give 369.1 grams (264 grams dry weight) of sodium sulfate.

During filtration at 40° C., a waxy yellow solid floated on the surface of the aqueous slurry. At the end of filtration, clumps of the waxy solid came to rest on the top of the filter mass.

The filtrate was cooled to 0° C. and filtered to give another 228.9 grams (103.3 grams dry weight) of sodium sulfate.

*Example 3* — Into a one liter, 5-neck flask equipped as the flask in Example 1, were placed three moles of 87% sulfuric acid, prepared by mixing 300 grams of 98% sulfuric acid with 37.8 grams of water. Forty-five grams (1.665 mole) of liquid hydrogen cyanide were placed in the addition funnel. The flask was cooled in an ice-bath and 9 ml of the hydrogen cyanide was added from the addition funnel. Isobutylene was passed into the solution through the gas inlet tube while the temperature was maintained at 20 to 25° C. The remaining hydrogen cyanide was added dropwise over a 60-minute period. A total of 87.1 grams (1.553 mole) of isobutylene were absorbed in 161 minutes.

The reaction mixture was then heated to 55 to 60° C. with nitrogen sparging for one-half hour. After cooling, it was neutralized and made alkaline with a total of 660 grams of 50% sodium hydroxide. The alkaline suspension was refluxed for one-half hour. Then, t-butyl amine (100.9 grams, 89% based on isobutylene) was distilled and recovered at 43° C. to 49° C.

Methyl formate was prepared by acidifying the alkaline pot residue with 98% sulfuric acid to pH 1.3 and adding two molar equivalents of methanol (99.5 grams, 3.1 mole). The mixture was refluxed for 1 hour. The methyl formate (40.6 grams, 39% based on isobutylene) was distilled and recovered at 31° C. to 35° C. An additional 91.3 grams (2.85 mole) of methanol was added, but no more esterification occurred.

The acidic pot residue was neutralized with 50% sodium hydroxide and the slurry was filtered on a Buchner funnel at 40° C. to give 463.1 grams (426.1 grams dry weight) of sodium sulfate. About 2 grams of the waxy solid were collected from the top of the solids on the filter paper. The filtrate (719.1 grams) contained 22.3% sulfate (calculated as anhydrous sodium sulfate). A total Kjeldahl nitrogen analysis indicated 1280 ppm TKN in the filtrate.

*Example 4* — Into a 2 liter, 5 neck flask equipped as described above, were placed four moles of 87% sulfuric acid, prepared by mixing 400 grams of 98% sulfuric acid with 50.4 grams of water. Sixty grams (2.22 mole) of liquid hydrogen cyanide were placed in the addition funnel. The flask was cooled in an ice-bath and a few ml of the hydrogen cyanide were added from the addition funnel. Isobutylene was passed into the solution through the gas inlet tube while the temperature was maintained at 20 to 25° C. The remaining hydrogen cyanide was added dropwise over an 80-minute period and a total of 120.9 grams (2.155 mole) of isobutylene was absorbed in 214 minutes.

The reaction mixture was then heated to 55 to 60° C. with nitrogen sparging for one-half hour. After cooling, it was neutralized and made alkaline with a total of 880 grams of 50% sodium hydroxide. The alkaline suspension was refluxed for one-half hour. Then t-butyl amine (125.3 grams, 80% based on isobutylene) was distilled and recovered at 43 to 49° C.

Methyl formate was prepared by acidifying the alkaline pot residue with 98% sulfuric acid to pH 1.0 and adding ten molar equivalents of methanol (690.5 grams, 21.55 mole). The mixture was refluxed for 1 hour. The methyl formate (125.8 grams, 75% based on isobutylene) was distilled and recovered at 31 to 35° C. The excess methanol (558.8 grams) was distilled and recovered at 64 to 67° C.

The acidic pot residue was neutralized with 50% sodium hydroxide and the slurry was filtered at 40° C. to give 720.3 grams (677.1 grams by dry weight) of sodium sulfate. The filtrate weighed 1050 grams.

*Example 5* — Into a one liter, 5-neck flask equipped as described above, were placed three moles of 87% sulfuric acid prepared by mixing 300 grams of 98% sulfuric acid with 37.8 grams of water. Forty-five grams (1.665 mole) of liquid hydrogen cyanide were placed in the addition funnel. The flask was cooled in an ice-bath and 5 ml of the hydrogen cyanide was added from the addition funnel. Isobutylene was passed into the solution through the gas inlet tube while the temperature was maintained at 20° C. to 25° C. The remaining hydrogen cyanide was added dropwise over a 46-minute period and a total of 89.5 grams (1.595 mole) of isobutylene was absorbed in 162 minutes.

The reaction mixture was then heated to 55° C. to 60° C. with nitrogen sparging for one-half hour. After cooling, it was neutralized and made alkaline with a total of 660 grams of 50% sodium hydroxide. The alkaline suspension was refluxed for one-half hour. Then t-butyl amine (103.6 grams, 89% based on isobutylene) was distilled and recovered at 43° C. to 49° C.

Methyl formate was prepared by acidifying the alkaline pot residue with 98% sulfuric acid to pH 1.9 and adding two molar equivalents of methanol (102.1 grams, 3.19 mole). The mixture was refluxed for 1 hour. The methyl formate (83.5 grams, 79% based on isobutylene) was distilled and recovered at 31° C. to 35° C. An additional 96 grams (3 moles) of methanol was added, but no more esterification occurred. The excess methanol (136.1 grams) was distilled and recovered at 64° C. to 67° C.

The acidic pot residue was neutralized with 50% sodium hydroxide and the slurry was filtered at 40° C. to give 468.2 gram (416.2 grams dry weight) of sodium sulfate. The filtrate weighed 743.4 grams.

TABLE 1 t-BUTYLAMINE SYNTHESIS

| | Charge | | | | | | | |
|---|---|---|---|---|---|---|---|---|
| | | | | Isobutylene | | | t-Butylamine | |
| Run | Concentrated 98% $H_2SO_4$ | $H_2O$ | HCN | Via Rotameter | Via Weight | 50% HaOH | Weight | % Yields |
| I | 100 g 1 mole | 12.6 g 0.7 mole | 15 g 0.555 mole | 30 g 0.535 mole | — | 220 g | 30.2 g | 77% |
| II | 300 g 3 mole | 37.8 g 2.1 mole | 49 g 1.813 mole | 88.55 g | 91 g 1.622 mole | 671.2 g | 85.6 g | 72% |

TABLE 1-continued
t-BUTYLAMINE SYNTHESIS

| | Charge | | | | | | | |
|---|---|---|---|---|---|---|---|---|
| | Concentrated | | | Isobutylene | | | t-Butylamine | |
| | | | | Via | Via | | | |
| Run | 98% H$_2$SO$_4$ | H$_2$O | HCN | Rotameter | Weight | 50% HaOH | Weight | % Yields |
| III | 300 g<br>3 mole | 37.8 g<br>2.1 mole | 45 g<br>1.665 mole | 88.6 g | 87.1 g<br>1.553 mole | 660.0 g | 100.9 g | 89% |
| IV | 400 g<br>4 mole | 50.4 g<br>2.8 mole | 60 g<br>2.22 mole | 120.9 g | 120.9 g<br>2.155 mole | 880.0 g | 125.3 g | 80% |
| V | 300 g<br>3 mole | 37.8 g<br>2.1 mole | 45 g<br>1.665 mole | 89.1 g | 89.5 g<br>1.595 mole | 660 g | 103.6 g | 89% |

TABLE II
METHYL FORMATE SYNTHESIS

| | | Methanol | | | Methyl Formate[1] | | | | | |
|---|---|---|---|---|---|---|---|---|---|---|
| Run | Reaction pH | Grams | Moles | Molar Equivalents | Grams Isolated | % Methanol | Grams | Moles | % Theory Based on Isobutylene | % Theory Based on t-Butylamine |
| I | 0.4 | 35.7 | 1.116 | 2 | 21.4 | 10 | 19.3 | 0.32 | 60[2] | 77 |
| II | 3.0 | 103.9 | 3.24 | 2 | 113.8 | 51 | 55.8 | 0.93 | 57 | 79 |
| III | 1.3 | 99.5 | 3.1 | 2 | 40.6 | 9 | 36.9 | 0.615 | 40 | 45 |
| IV | 1.0 | 690.5 | 21.55 | 10 | 125.8 | 15 | 106.9 | 1.78 | 83 | 104[3] |
| V | 1.9 | 102.1 | 3.19 | 2 | 83.5 | 10 | 75.2 | 1.25 | 78 | 88 |

[1] Percent yields of methyl formate calculated for weight of methyl formate corrected for methanol content.
[2] Initial low yields of methyl formate appear to have been due to poor trapping of the volatile ester. Dry ice/acetone trapping in IV and V improved the yields.
[3] A yield of methyl formate greater than the t-butylamine yield indicates that some of the unreacted HCN was hydrolyzed to produce formate.

A preferred method of using this invention to produce tertiary butylamine, methyl formate and sodium sulfate from HCN, isobutylene, sulfuric acid, methanol and caustic soda employs a reactor equipped with an agitator, reflux condenser, circulating pump, and heat exchanger piped so that the reactor's bottom outlet is connected to the suction side of the pump, the outlet of the pump is connected to the heat exchanger's inlet and the outlet of the heat exchanger is connected to an inlet nozzle of the reactor.

A charge of 87% sulfuric acid is pumped into the reactor and the acid circulated through the heat exchanger. Brine, preferably in the range of −5° C. to 5° C. is pumped through the heat exchanger at such a rate that during the reaction its temperature does not exceed about 15° C. The reactor is also equipped with an inlet feed nozzle connected to a delivery tube that extends close to the bottom of the reactor. This is used to feed liquid HCN to the reactor at a controlled rate. Another inlet nozzle is connected to a gas diffuser positioned so that the gas leaving the diffuser will be sucked into the vortex created by the turbine agitator. This arrangement is used to feed gaseous isobutylene to the reactor at a controlled rate.

While circulating the charge in the reactor through the heat exchanger, liquid HCN and gaseous isobutylene are added to the reactor. About 10% of the total amount of HCN used in each batch is added initially to the chilled sulfuric acid. Then HCN and isobutylene are added in equimolar proportions at such a rate that the temperature of the liquid mixture in the reactor stays between 20° C. and 25° C.

After all the reactants have been added to the reactor, circulation and agitation of the mixture is continued for an additional period of time. This time period is not critical; generally, for fifteen to thirty minutes.

The remaining operations can be carried out in the same reactor but it is preferred to pump the entire mixture into a second reactor equipped in many ways like the first one. The differences between the auxiliaries with which each reactor is equipped will be obvious from the description below.

As the acidic mixture is transferred to the second reactor, circulation is started through its heat exchanger and while the circulation is continuing, steam is passed into the heat exchanger to raise the temperature of the reactor's contents to about 60° C. The mixture is held at this temperature for about 30 minutes. At this point the steam is shut off and cooling water circulated through the heat exchanger. Brine is passed through the reflux condenser. Aqueous, 50% caustic soda is pumped into the reactor at such a rate that the temperature remains below 60° C. After all the caustic soda has been charged, the cooling water is replaced with steam. The mixture is refluxed for about 30 minutes after which the condensed vapors are then led to a receiver instead of flowing back into the reactor.

After all of the tertiary butyl amine has been vaporized and recovered to obtain one of the products of the process, the valving is changed so that any condensed vapors will return to the reactor. Methanol is charged to the reactor using 2 moles of methanol for each mole of sodium formate in the reaction mixture. After all the methanol has been charged, concentrated sulfuric acid is pumped into the reactor slowly until the mixture has a pH below 1. The mixture is allowed to reflux for not less than 30 minutes. Then the valving is changed and all of the condensed vapors are collected without returning any to the reactor. Distillation is continued until the slurry in the reactor reaches a temperature of about 101° C.

Steam is shut off and the hot slurry pumped out of the reactor into a settling tank containing part of a previous batch. The settling tank is equipped with side draw-off means as well as at its base.

While maintaining the temperature above 50° C., the mixture is allowed to remain quiescent for at least an hour. When stratification is complete, a portion of the upper organic liquid phase is pumped out of the tank using a side outlet located above the interface between the aqueous layer and the organic liquid layer.

Substantially all of the solid sodium sulfate and the bulk of the aqueous sodium sulfate solution are withdrawn through the bottom outlet of the settler into an agitation-equipped feed tank of a direct-fired sodium sulfate dryer.

The contents of the feed tank are continuously agitated to provide the dryer with feed which has a reasonably constant composition. The material leaving the direct-fired dryer is substantially pure, dry, sodium sulfate which is a second product of the process. This good quality is obtained without any purification operations other than the separation of the water-immiscible organic liquid.

The distillate recovered from the second reactor is fed to a fractional distillation unit. In this unit three fractions are obtained. The lowest boiling is methyl formate which at atmospheric pressure has a boiling range between 31° C. and 35° C.; the second fraction is methanol whose boiling range is between 65° C. and 75° C.; the third fraction is water.

The methyl alcohol fraction is returned to the process. The water is discarded and the methyl formate is obtained as the third product of the process.

From the preceding description, it can be seen that the production of methyl formate along with sodium sulfate and tertiary butyl amine requires the consumption of methanol and a plant installation capable of not only efficiently separating methanol and methyl formate from water but also of efficiently separating and recovering the much more volatile — B.P. 32° C. — methyl formate from methanol.

Equipment requirements are simplified, total formate recovery is increased and the consumption of methanol is eliminated by substituting for the recovery of methyl formate the production of sodium formate. In this instance, carrying out an additional reaction simplifies the overall process.

This variation of the invention is illustrated by the following example.

*Example 6* — 313.5 grams of 50% sodium hydroxide were charged to a 1.0 liter, 3 necked flask equipped with a thermometer, agitator, charging funnel, jacketed distillation column, condenser, and receiver.

With the temperature of the sodium hydroxide at 25° C., cooling applied to the flask, and the agitator in operation over a 60 minute interval. 185.2 grams of methyl formate were added to the flask. The temperature was not allowed to rise above 25° C.

After all of the methyl formate was in the flask, the charging funnel was replaced with a stopper. The flask was warmed and its contents heated under total reflux until the vapors were at a temperature of 65° C. The cooling water flowing through the jacket of the distillation column was turned off and vapor reaching the condenser was liquefied and recovered.

When the temperature of the contents of the flask was 100° C., the heating was discontinued and the contents of the flask allowed to cool.

The distillate was weighed and analyzed, as was the contents of the flask.

The methanol recovery was 99%.

The methyl formate conversion to methanol and sodium formate was 99.5%.

On the production scale, the process is carried out by proceeding exactly as has been described up to the step that methyl formate and methanol are vaporized.

Instead of processing the mixed vapor to recover methyl formate and methanol, the mixed vapor is brought into contact with a concentrated aqueous sodium hydroxide containing solution to saponify the methyl formate. One method consists of charging concentrated caustic soda solution to a jacketed reactor equipped with a short fractionating solumn, a vapor inlet nozzle, an agitator, and a condenser piped so the condensate can be collected or returned to the column as reflux. Brine is fed to the reflux condenser so that it condenses any liquid boiling above 15° C.

With the stirrer in operation and brine flowing through the condenser, vapor from the esterification reactor is directed into the reactor containing the aqueous alkaline solution. It is desirable but not essential to introduce the vapor below the level of the alkaline solution. Any unreacted vapor is condensed and the total condensate returned to the sodium hydroxide solution in the column as reflux. By operating in this fashion the aqueous sodium hydroxide hydrolyzes the methyl formate to methyl alcohol and sodium formate:

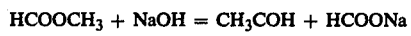

The reaction goes quantitatively as demonstrated by the above example.

The amount of sodium hydroxide charged to the reactor is at least substantially equivalent to and preferably in excess of the amount of methyl formate formed in the esterification step.

After all of the methyl formate formed in the esterification step has been vaporized and hydrolyzed, the reactor contains a mixture of water, caustic soda, sodium formate and methanol.

The valving is then changed so that the condensate is collected rather than returned as reflux. Steam is then admitted to the jacket. The contents of the reactor are heated, the methanol in the mixture is vaporized and recovered. All of the methanol is vaporized when the temperature of the sodium formate solution in the reactor reaches a temperature of 100° C.

The recovered methanol is recycled to the esterification step of the process.

The contents of the reactor are cooled and filtered and the filter cake washed with a minimum of water. The filtrate and wash liquor are returned to the reactor and, its excess water content boiled off. Additional caustic soda is added to the reactor and the cycle repeated. The washed filter cake can be dried and sold or dissolved and sold as an aqueous solution.

The production of methyl formate or sodium formate depends upon market conditions. The invention, as has been explained, is the result of the discovery that high yields of unexpectedly high quality sodium sulfate, sodium formate or methyl formate and tertiary butylamine are obtained by following the procedures described above.

We claim:

1. A process for the treatment of waste from the production of tertiary butyl amine by:
   reacting isobutylene, hydrogen cyanide and sulfuric acid, with a stoichiometric excess of sulfuric acid, then adding more than one mole of sodium hydroxide for each equivalent of sulfuric acid and hydrogen cyanide employed in the initial reaction, thereby forming a heterogeneous mixture containing water, sodium hydroxide, sodium sulfate, N-tertiary butylformamide and an unknown organic substance,
   hydrolyzing said N-tertiary butylformamide with said sodium hydroxide to form a heterogeneous mixture in which water, sodium sulfate, sodium hydroxide, tertiary butyl amine, sodium formate and the unknown organic substance are contained, heating the aforesaid mixture to vaporize and recover said tertiary butylamine, thereby forming a residual waste mixture, said process comprising recovering values from said residual waste mixture by the steps of:

(a) adding sufficient concentrated sulfuric acid to said residual mixture to bring its pH below 3.5 and sufficient methanol to said mixture so that the molar ratio of methanol to formate is not less than 2;

(b) refluxing the mixture of step (a) to convert substantially all of the formate to methyl formate;

(c) heating the mixture formed in step (b) to vaporize and recover methyl formate and methyl alcohol and leave a mixture which at a temperature above about 50° C. contains three phases, solid sodium sulfate and two immiscible, separable, liquid phases, the less dense liquid phase being a water insoluble, yellow organic substance and the more dense liquid phase being an acidic aqueous sodium sulfate solution;

(d) maintaining the mixture formed in step (c) above about 50° C. and separating the less liquid dense phase from the other two phases; and (e) recovering anhydrous, white, crystalline sodium sulfate from the residue of step (d).

2. The process according to claim 1 wherein the methyl formate and methyl alcohol recovered in step (c) as a single distillate are separated into methyl alcohol and methyl formate by fractional distillation.

3. The process according to claim 2 wherein the separated methyl alcohol is recycled to step (a).

4. The process according to claim 1 wherein to the mixture formed in step (c) sufficient concentrated aqueous caustic soda is added to bring its pH to between 6.0 and 8.0 before separating the less dense, liquid phase from the solid sodium sulfate and aqueous sodium sulfate solution.

5. The process of claim 1 in which the sulfuric acid has a concentration of not less than 87% and the sodium hydroxide has a concentration of not less than 50%.

6. A process for the treatment of waste from the production of tertiary butyl amine by:

reacting isobutylene, hydrogen cyanide and sulfuric acid, with a stoichiometric excess of sulfuric acid, then adding more than one mole of sodium hydroxide for each equivalent of sulfuric acid and hydrogen cyanide employed in the initial reaction, thereby forming a heterogeneous mixture containing water, sodium hydroxide, sodium sulfate, N-tertiary butylformamide and an unknown organic substance, hydrolyzing said N-tertiary butylformamide with said sodium hydroxide to form a heterogeneous mixture in which water, sodium sulfate, sodium hydroxide, tertiary butyl amine, sodium formate and the unknown organic substance are contained, heating the aforesaid mixture to vaporize and recover said tertiary butyl amine, thereby forming a residual waste mixture, said process comprising recovering additional values from said residual waste mixture by the steps of:

(a) adding sufficient concentrated sulfuric acid to said residual mixture to bring its pH below 3.5 and sufficient methanol to said mixture so that the molar ratio of methanol to formate is not less than 2;

(b) refluxing the mixture of step (a) to convert substantially all of the formate to methyl formate;

(c) heating the mixture formed in step (b) to vaporize methyl formate and methyl alcohol and leave a mixture which at a temperature above about 50° C. contains three phases, solid sodium sulfate and two immiscible, separable liquid phases, the less dense liquid phase being a water insoluble, yellow organic substance and the more dense liquid phase being an acidic aqueous sodium sulfate solution;

(d) maintaining the mixture formed in step (c) above about 50° C. and separating the less dense liquid phase from the other two phases;

(e) recovering anhydrous, white, crystalline sodium sulfate from the residue of step (d);

(f) contacting the methyl formate-containing vapors obtained in step (c) with an aqueous caustic soda solution to form methyl alcohol and an aqueous sodium formate solution; and (g) separating and recovering the methyl alcohol formed in step (f).

7. The process of claim 6 wherein sufficient concentrated caustic soda is added to the mixture formed in step (c) bring the pH between 6 and 8 before separating the less dense phase from the other two phases.

8. The process of claim 6 wherein the methyl alcohol recovered in step (f) is recycled to step (a).

9. The process of claim 6 wherein the concentration of sulfuric acid is not less than 87% and that of caustic soda is not less than 50%.

* * * * *